(12) United States Patent
Ayotte et al.

(10) Patent No.: US 11,350,229 B2
(45) Date of Patent: May 31, 2022

(54) METHOD AND SYSTEM FOR DETERMINING A POSITION OF A MICROPHONE

(71) Applicant: CAE INC., Saint-Laurent (CA)

(72) Inventors: Maxime Ayotte, Saint-Laurent (CA); Laurent Desmet, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 0 days.

(21) Appl. No.: 16/365,759

(22) Filed: Mar. 27, 2019

(65) Prior Publication Data

US 2019/0306642 A1 Oct. 3, 2019

(30) Foreign Application Priority Data

Mar. 29, 2018 (CA) .................. CA 3000122

(51) Int. Cl.
| | | |
|---|---|---|
| H04R 29/00 | (2006.01) | |
| H04R 1/40 | (2006.01) | |
| H04R 3/12 | (2006.01) | |
| H04S 7/00 | (2006.01) | |
| G01S 5/30 | (2006.01) | |

(52) U.S. Cl.
CPC .............. *H04R 29/004* (2013.01); *G01S 5/30* (2013.01); *H04R 1/403* (2013.01); *H04R 3/12* (2013.01); *H04S 7/301* (2013.01); *H04S 7/303* (2013.01); *H04S 7/40* (2013.01)

(58) Field of Classification Search
CPC ........ H04R 29/004; H04R 1/403; H04S 7/303
See application file for complete search history.

(56) References Cited

U.S. PATENT DOCUMENTS

| | | | | |
|---|---|---|---|---|
| 5,600,727 A | * | 2/1997 | Sibbald | .................. H04R 3/005 381/122 |
| 6,201,499 B1 | | 3/2001 | Hawkes et al. | |
| 6,690,618 B2 | | 2/2004 | Tomasi et al. | |
| 7,522,736 B2 | | 4/2009 | Adcock et al. | |
| 7,587,053 B1 | * | 9/2009 | Pereira | .................. H04R 3/005 381/387 |
| 8,644,113 B2 | | 2/2014 | Harrell et al. | |
| 9,081,083 B1 | | 7/2015 | Chu | |

(Continued)

FOREIGN PATENT DOCUMENTS

| | | |
|---|---|---|
| EP | 3258709 | 12/2017 |
| WO | 2017137071 | 8/2017 |

*Primary Examiner* — James K Mooney
(74) *Attorney, Agent, or Firm* — Fasken Martineau Dumoulin LLP; Serge Lapointe

(57) ABSTRACT

A method for determining an actual position of a microphone, comprising: sequentially emitting a first sound signal via a first speaker positioned and a second sound signal via a second speaker positioned; measuring a first elapsed time between the emission of the first sound signal and a detection of the first sound signal by the microphone, and a second elapsed time between the emission of the second sound signal and a detection of the second sound signal by the microphone; determining a first distance between the first speaker and the microphone using the first elapsed time, and a second distance between the second speaker and the microphone using the second elapsed time; determining the actual position of the microphone using the first and second distances and the positions of the first and second speaker; and outputting the actual position.

24 Claims, 7 Drawing Sheets

(56) References Cited

U.S. PATENT DOCUMENTS

| | | | |
|---|---|---|---|
| 9,194,938 B2 | 11/2015 | Velusamy | |
| 9,489,948 B1 | 11/2016 | Chu et al. | |
| 10,070,244 B1* | 9/2018 | Dabney | H04S 7/301 |
| 2003/0031333 A1* | 2/2003 | Cohen | H04S 7/301 |
| | | | 381/303 |
| 2005/0152557 A1* | 7/2005 | Sasaki | H04S 7/302 |
| | | | 381/58 |
| 2005/0249360 A1* | 11/2005 | Adcock | H04R 3/005 |
| | | | 381/92 |
| 2008/0226087 A1* | 9/2008 | Kinghorn | H04S 7/301 |
| | | | 381/59 |
| 2012/0114152 A1* | 5/2012 | Nguyen | G06K 9/0057 |
| | | | 381/303 |

* cited by examiner

METHOD AND SYSTEM FOR DETERMINING A POSITION OF A MICROPHONE

TECHNICAL FIELD

The present invention relates to the field of methods and system for determining the position of a microphone, and more particularly to methods and systems for determining the position of a microphone using sound signals generated by speakers.

BACKGROUND

In the context of simulators such as vehicle simulators, the location of a microphone to be used for sound tests or calibration is usually important to ensure repeatability such as when running sound Qualification Test Guide (QTG) tests. If when running sound tests the microphone is positioned at a location different from previous positions, there will be difference in travel distance between the speakers and the microphone and this difference in travel distance may cause a dephasing of the period signals which will cause different interference and modify the recorded signal amplitudes.

Usually, pictures are provided to help a user installing the microphone at the desired position. However, this solution for installing the microphone at the desired position may not be adequate since it is subject to individual interpretation of the pictures.

Another solution consists in providing the user with a custom fixed tripod on which the microphone is installed. However, such a custom fixed tripod may be obstructive and the installation of the custom fixed tripod can be time consuming in addition to be expensive.

Therefore, there is a need for an improved method and system for determining whether a microphone is positioned at a desired position.

SUMMARY

According to a first broad aspect, there is provided a computer-implemented method for determining whether a given microphone occupies a target position, comprising: receiving a reference time delay between a first reference signal emitted by a first speaker and recorded by a reference microphone having the target position and a second reference signal emitted by a second speaker and recorded by the reference microphone having the target position, the first and second speakers each having a fixed position and the emission of the first and second reference signals being spaced apart by a reference time delay; using the given microphone positioned at a given position, recording a first sound signal emitted by the first speaker and a second sound signal emitted by the second speaker, the emission of the first and second sound signals being spaced apart by the reference time delay; determining an actual time delay between the first sound signal and the second sound signal; comparing the actual time delay to the reference time delay; determining a match between the given position and the target position for the given microphone if the actual time delay corresponds to the reference time delay and a mismatch between the given position and the target position for the given microphone if the actual time delay is different from the reference time delay; and outputting an indication of one of the match and the mismatch.

In one embodiment, the reference time delay is chosen to be greater than a reverberation time.

In one embodiment, said outputting an indication comprises outputting an indication of the match between the given position and the target position for the given microphone.

In one embodiment, said outputting an indication comprises outputting an indication of the mismatch between the given position and the target position for the given microphone.

In one embodiment, the indication of the mismatch comprises a suggested displacement for displacing the given microphone.

In one embodiment, said outputting an indication comprises outputting one of a visual indication and an audio indication.

In one embodiment, the method further comprises: emitting the first sound signal via the first speaker; and emitting the second sound signal via the second speaker after the reference time delay.

In one embodiment, said determining the match comprises determining the match between the given position and the target position for the given microphone if the actual time delay is comprised within a range of time delay containing the reference time delay and said determining the mismatch comprises determining the mismatch between the given position and the target position for the given microphone if the actual time delay is outside of the range of time delay.

In one embodiment, the method further comprises: receiving a further reference delay between the second reference signal and a third reference signal emitted by a third speaker and recorded by the microphone having the target position, the third speaker having a fixed location and the emission of the second and third reference signals being spaced apart by a predefined time delay; recording, via the given microphone positioned at the given position, a third sound signal emitted by the third speaker, the emission of the second and third sound signals being spaced apart by the predefined time delay; determining a given time delay between the second sound signal and the third sound signal; and comparing the given time delay to the further reference delay; said determining the match comprising determining the match between the given position and the target position for the given microphone if the actual time delay corresponds to the reference time delay and the given time delay corresponds to the further reference delay, and said determining the mismatch comprising determining the mismatch between the given position and the target position for the given microphone if at least one of the actual time delay is different from the reference time delay and the given time delay is different from the further reference delay.

In one embodiment, the predefined time delay is chosen to be greater than a reverberation time.

In one embodiment, said determining the match comprises determining the match between the given position and the target position for the given microphone if the actual time delay is comprised within a first range of time delay containing the reference time delay and the given time delay is comprised within a second range of time delay containing the further reference delay, and said determining the mismatch comprises determining the mismatch between the given position and the target position for the given microphone if at least one of the actual time delay is outside the first range of time delay and the given time delay is outside the second range of time delay.

In one embodiment, the reference microphone corresponds to the given microphone.

According to a second broad aspect, there is provided a system for determining whether a given microphone occupies a target position, comprising: a communication unit for at least one of receiving and transmitting data, a memory and a processing unit configured for executing the steps of the above method.

According to a third broad aspect, there is provided a system for determining whether a given microphone occupies a target position, comprising: a sound recording unit connectable to the given microphone to be positioned at a given position, the sound recording unit configured for recording a first sound signal emitted by a first speaker and a second sound signal emitted by a second speaker, the emission of the first and second sound signals being spaced apart by a reference time delay, the first and second speakers each having a fixed position; a time delay unit configured for determining an actual time delay between the first sound signal and the second sound signal; a match identification unit configured for: receiving a reference time delay between a first reference signal emitted by the first speaker and recorded by a reference microphone having a target position and a second reference signal emitted by the second speaker and recorded by the reference microphone having the reference position, the emission of the first and second reference signals being spaced apart by the reference time delay; comparing the actual time delay to the reference time delay; determining a match between the given position and the reference position for the given microphone if the actual time delay corresponds to the reference time delay and a mismatch between the given position and the target position for the given microphone if the actual time delay is different from the reference time delay; and outputting an indication of one of the match and the mismatch.

In one embodiment, the reference time delay is chosen to be greater than a reverberation time.

In one embodiment, the match identification unit is configured for outputting the indication of the match between the given position and the target position for the given microphone.

In one embodiment, the match identification unit is configured for outputting the indication of the mismatch between the given position and the target position for the given microphone.

In one embodiment, the indication of the mismatch comprises a suggested displacement for displacing the given microphone.

In one embodiment, the match identification unit is configured for outputting one of a visual indication and an audio indication.

In one embodiment, the system further comprises a sound emitting unit configured for: emitting the first sound signal via the first speaker; and emitting the second sound signal via the second speaker after the reference time delay.

In one embodiment, the match identification unit is configured for: determining the match between the given position and the target position for the given microphone if the actual time delay is comprised within a range of time delay containing the reference time delay; and determining the mismatch between the given position and the target position for the given microphone if the actual time delay is outside of the range of time delay.

In one embodiment, the sound recording unit is further configured for recording, via the given microphone positioned at the given position, a third sound signal emitted by a third speaker, the emission of the second and third sound signals being spaced apart by a predefined time delay; the time delay unit is further configured for determining a given time delay between the second sound signal and the third sound signal; and the match identification unit is further configured for: receiving a further reference delay between the second reference signal and a third reference signal emitted by the third speaker and recorded by the microphone having the target position, the third speaker having a fixed location and the emission of the second and third reference signals being spaced apart by the predefined time delay; comparing the given time delay to the further reference delay; determining the match between the given position and the reference position for the given microphone if the actual time delay corresponds to the reference time delay and the given time delay corresponds to the further reference delay, and determining the mismatch between the given position and the reference position for the given microphone if at least one of the actual time delay is different from the reference time delay and the given time delay is different from the further reference delay.

In one embodiment, the predefined time delay is chosen to be greater than a reverberation time.

In one embodiment, the match identification unit is configured for: determining the match between the given position and the target position for the given microphone if the actual time delay is comprised within a first range of time delay containing the reference time delay and the given time delay is comprised within a second range of time delay containing the further reference delay; and determining the mismatch between the given position and the target position for the given microphone if at least one of the actual time delay is outside the first range of time delay and the given time delay is outside the second range of time delay.

In one embodiment, the reference microphone corresponds to the given microphone.

According to another broad aspect, there is provided a computer-implemented method for determining whether a microphone occupies a desired position, comprising: receiving a target position for the microphone; sequentially emitting a first sound signal via a first speaker positioned at a first speaker position, and a second sound signal via a second speaker positioned at a second speaker position; measuring a first elapsed time between the emission of the first sound signal by the first speaker and a detection of the first sound signal by the microphone, and a second elapsed time between the emission of the second sound signal by the second speaker and a detection of the second sound signal by the microphone; determining a first distance between the first speaker position and the microphone using the first elapsed time, and a second distance between the second speaker position and the microphone using the second elapsed time and; determining an actual position of the microphone using the first and second distances and the first and second speaker positions; comparing the actual position of the microphone to the target position; determining a match between the actual position and the target position for the microphone if the actual position corresponds to the target position and a mismatch between the actual position and the target position for the given microphone if the actual position is different from the target position; and outputting an indication of one of the match and the mismatch.

In one embodiment, the method further comprises: emitting a third sound signal via a third speaker positioned at a third speaker position; measuring a third elapsed time between the emission of the third sound signal by the third speaker and a detection of the third sound signal by the microphone; and determining a third distance between the third speaker position and the microphone using the third elapsed time, said determining the actual position of the microphone is performed using further the third distance and the third speaker position.

In one embodiment, the method further comprises recording, via the microphone, the first sound signal emitted by the first speaker, the second sound signal emitted by the second speaker and the third sound signal emitted by the third speaker.

In one embodiment, an emission of the first sound signal and an emission of the second sound signal are spaced apart by a first time delay and an emission of the second sound signal and an emission of the third sound signal are spaced apart by a second time delay.

In one embodiment, the first and second time delays are each greater than a reverberation time.

In one embodiment, said outputting the indication comprises outputting the indication of the match between the actual position and the target position for the microphone.

In one embodiment, said outputting the indication comprises outputting the indication of the mismatch between the actual position and the target position for the given microphone.

In one embodiment, the method further comprises determining a suggested displacement for the microphone using the actual position and the target position, said outputting the indication of the mismatch comprising outputting the suggested displacement for the microphone.

In one embodiment, said outputting an indication comprises outputting one of a visual indication and an audio indication.

In one embodiment, said determining the match comprises determining the match between the actual position and the target position for the given microphone if the actual position is comprised within a range of position containing the target position and said determining the mismatch comprises determining the mismatch between the actual position and the target position for the given microphone if the actual position is outside of the range of position.

In one embodiment, said determining an actual position of the microphone is performed using a trilateration method.

In one embodiment, said determining an actual position of the microphone is performed using a nonlinear least squares fitting method.

According to a further broad aspect, there is provided a system for determining whether a microphone occupies a target position, comprising: a communication unit for at least one of receiving and transmitting data, a memory and a processing unit configured for executing the steps of the above method.

According to still another broad aspect, there is provided a system for determining whether a microphone occupies a desired position, comprising: a sound emitting unit configured for successively emitting a first sound signal via a first speaker positioned at a first speaker position and a second sound signal via a second speaker positioned at a second speaker position; a distance measurement unit configured for: measuring a first elapsed time between the emission of the first sound signal by the first speaker and a detection of the first sound signal by the microphone and a second elapsed time between the emission of the second sound signal by the second speaker and a detection of the second sound signal by the microphone; and determining a first distance between the first speaker position and the microphone using the first elapsed time and a second distance between the second speaker position and the microphone using the second elapsed time and; a position determining unit configured for determining an actual position of the microphone using the first and second distances and the first and second speaker positions; a match identification unit configured for: receiving a target position for the microphone; comparing the actual position of the microphone to the target position; determining a match between the actual position and the target position for the microphone if the actual position corresponds to the target position and a mismatch between the actual position and the target position for the given microphone if the actual position is different from the target position; and outputting an indication of one of the match and the mismatch.

In one embodiment, the sound emitting unit is further configured for emitting a third sound signal via a third speaker positioned at a third speaker position; the distance measurement unit is further configured for: measuring a third elapsed time between the emission of the third sound signal by the third speaker and a detection of the third sound signal by the microphone; and determining a third distance between the third speaker position and the microphone using the third elapsed time; and the position determining unit is configured for determining the actual position of the microphone using further the third distance and the third speaker position.

In one embodiment, the system further comprises a sound recording unit connectable to the microphone and configured for recording, via the microphone, the first sound signal emitted by the first speaker, the second sound signal emitted by the second speaker and the third sound signal emitted by the third speaker.

In one embodiment, an emission of the first sound signal and an emission of the second sound signal are spaced apart by a first time delay and an emission of the second sound signal and an emission of the third sound signal are spaced apart by a second time delay.

In one embodiment, the first and second time delays are each greater than a reverberation time.

In one embodiment, the match identification unit is configured for outputting the indication of the match between the actual position and the target position for the microphone.

In one embodiment, the match identification unit is configured for outputting the indication of the mismatch between the actual position and the target position for the given microphone.

In one embodiment, the system further comprises a displacement determining unit configured for determining a suggested displacement for the microphone using the actual position and the target position, the match identification unit being configured for outputting the suggested displacement for the microphone.

In one embodiment, the match identification unit is configured for outputting one of a visual indication and an audio indication.

In one embodiment, the match identification unit is configured for: determining the match between the actual position and the target position for the given microphone if the actual position is comprised within a range of position containing the target position; and determining the mismatch between the actual position and the target position for the given microphone if the actual position is outside of the range of position.

In one embodiment, the position determining unit is configured for determining the actual position of the microphone using a trilateration method.

In one embodiment, the position determining unit is configured for determining the actual position of the microphone using a nonlinear least squares fitting method.

According to still a further broad aspect, there is provided a computer-implemented method for determining an actual position of a microphone, comprising: sequentially emitting a first sound signal via a first speaker positioned at a first speaker position, and a second sound signal via a second speaker positioned at a second speaker position; measuring a first elapsed time between the emission of the first sound signal by the first speaker and a detection of the first sound signal by the microphone, and a second elapsed time between the emission of the second sound signal by the second speaker and a detection of the second sound signal by the microphone; determining a first distance between the first speaker position and the microphone using the first elapsed time, and a second distance between the second speaker position and the microphone using the second elapsed time and; determining the actual position of the microphone using the first and second distances and the first and second speaker positions; and outputting the actual position of the microphone.

In one embodiment, the method further comprises: emitting a third sound signal via a third speaker positioned at a third speaker position; measuring a third elapsed time between the emission of the third sound signal by the third speaker and a detection of the third sound signal by the microphone; and determining a third distance between the third speaker position and the microphone using the third elapsed time, said determining the actual position of the microphone is performed using further the third distance and the third speaker position.

In one embodiment, the method further comprises recording, via the microphone, the first sound signal emitted by the first speaker, the second sound signal emitted by the second speaker and the third sound signal emitted by the third speaker.

In one embodiment, an emission of the first sound signal and an emission of the second sound signal are spaced apart by a first time delay and an emission of the second sound signal and an emission of the third sound signal are spaced apart by a second time delay.

In one embodiment, the first and second time delays are each greater than a reverberation time.

In one embodiment, said determining the actual position of the microphone is performed using a trilateration method.

In one embodiment, said determining an actual position of the microphone is performed using a nonlinear least squares fitting method.

According to still another broad aspect, there is provided a system for determining an actual position of a microphone, comprising: a communication unit for at least one of receiving and transmitting data, a memory and a processing unit configured for executing the steps of the above method.

According to still a further broad aspect, there is provided system for determining an actual position of a microphone, comprising: a sound emitting unit configured for successively emitting a first sound signal via a first speaker positioned at a first speaker position and a second sound signal via a second speaker positioned at a second speaker position; a distance measurement unit configured for: measuring a first elapsed time between the emission of the first sound signal by the first speaker and a detection of the first sound signal by the microphone and a second elapsed time between the emission of the second sound signal by the second speaker and a detection of the second sound signal by the microphone; and determining a first distance between the first speaker position and the microphone using the first elapsed time and a second distance between the second speaker position and the microphone using the second elapsed time; and a position determining unit configured for determining the actual position of the microphone using the first and second distances and the first and second speaker positions, and outputting the actual position of the microphone.

In one embodiment, the sound emitting unit is further configured for emitting a third sound signal via a third speaker positioned at a third speaker position; the distance measurement unit is further configured for: measuring a third elapsed time between the emission of the third sound signal by the third speaker and a detection of the third sound signal by the microphone; and determining a third distance between the third speaker position and the microphone using the third elapsed time; and the position determining unit is configured for determining the actual position of the microphone using further the third distance and the third speaker position.

In one embodiment, the system further comprises a sound recording unit connectable to the microphone and configured for recording, via the microphone, the first sound signal emitted by the first speaker, the second sound signal emitted by the second speaker and the third sound signal emitted by the third speaker.

In one embodiment, an emission of the first sound signal and an emission of the second sound signal are spaced apart by a first time delay and an emission of the second sound signal and an emission of the third sound signal are spaced apart by a second time delay.

In one embodiment, the first and second time delays are each greater than a reverberation time.

In one embodiment, the position determining unit is configured for determining the actual position of the microphone using a trilateration method.

In one embodiment, the position determining unit is configured for determining the actual position of the microphone using a nonlinear least squares fitting method.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
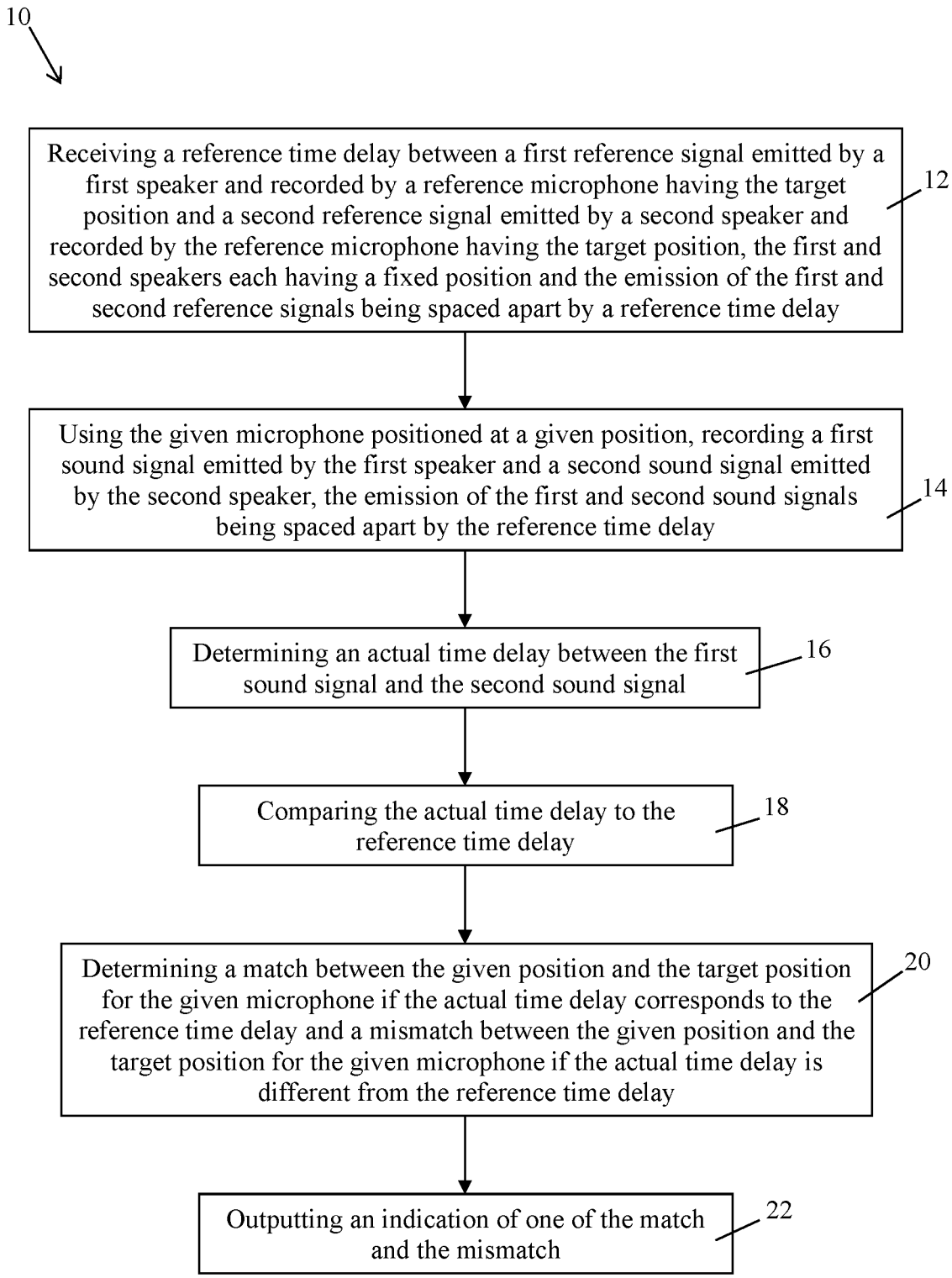
FIG. 1 is a flow chart of a method for determining whether a microphone occupies a desired position using time delays between successively detected signals, in accordance with an embodiment.

FIG. 1 illustrates one embodiment of a method 10 for determining whether a microphone is positioned at a target and desired position. The method 10 is to be performed by a computer machine provided with at least communication means, a processing unit and a memory. For example, the method 10 may be used for calibrating sound and/or running sound tests in a simulator such as a vehicle simulator. In such cases, positioning a microphone at the same position as a previous position is of importance for ensuring that the calibration is correct and/or the results of the tests are reliable.

The method 10 is performed using at least two speakers connected to a playback system for playing back sound signals via each one of the speakers. Each speaker is located at a fixed position which does not vary in time. In one embodiment, the position of each speaker is unknown while being constant in time. In another embodiment, the position of each speaker is known and constant in time.

At step 12, a reference time delay is received. In order to obtain the time reference time delay, a microphone is positioned at a given position 30 relative to two speakers 32 and 34. The given position 30 is referred hereinafter to as the target position for the microphone since the aim the method 10 is to help a user position a microphone at the position 30. The reference time delay corresponds to the time delay that occurs between the capture of a first reference sound signal and the capture of a second reference sounds signal. The capture of the first and second reference sound signals is performed by the a microphone while the microphone is positioned at the position 30.

The first reference sound signal is emitted by a first speaker, e.g. speaker 32, while the second reference sound signal is emitted by a second and different speaker, e.g. speaker 34. The playback system used for playing back the first and second reference sound signals via the first and second speakers, respectively, is configured for successively playing back the first and second reference sound signals so that a time delay is present between the end of the playback of the first reference sound signal via the first speaker and the beginning of the playback of the second reference sound signal via the second speaker. This time delay is referred to as the reference time delay hereinafter.

In an embodiment in the method 10 is performed in a closed space or a partially-closed space such as in a simulator, the reference time delay is chosen to be greater than the reverberation time of the closed or partially-closed space. In another embodiment, the reference time delay is chosen to be equal to or less than the reverberation time of the closed or partially-closed space.

Referring back to FIG. 1, a microphone is positioned at a given position relative to the first and second speakers in order to perform steps 14-22 of the method 10. In one embodiment, the microphone is positioned at a random location relative to the first and second speakers. In another embodiment, the microphone is positioned at a position believed to be at least close to the target position. Using the playback system a first test sound signal is emitted via the first speaker and recorded using the microphone at eh given position. Then a second test sound signal is emitted via the second speaker and recorded by the microphone at the given position. The playback system is configured for playing back the first and second test sound signals so that the first and second test signals are temporally spaced apart by the same time delay as the one between the first and second reference sound signals, i.e. by the reference time delay.

Figure 3:
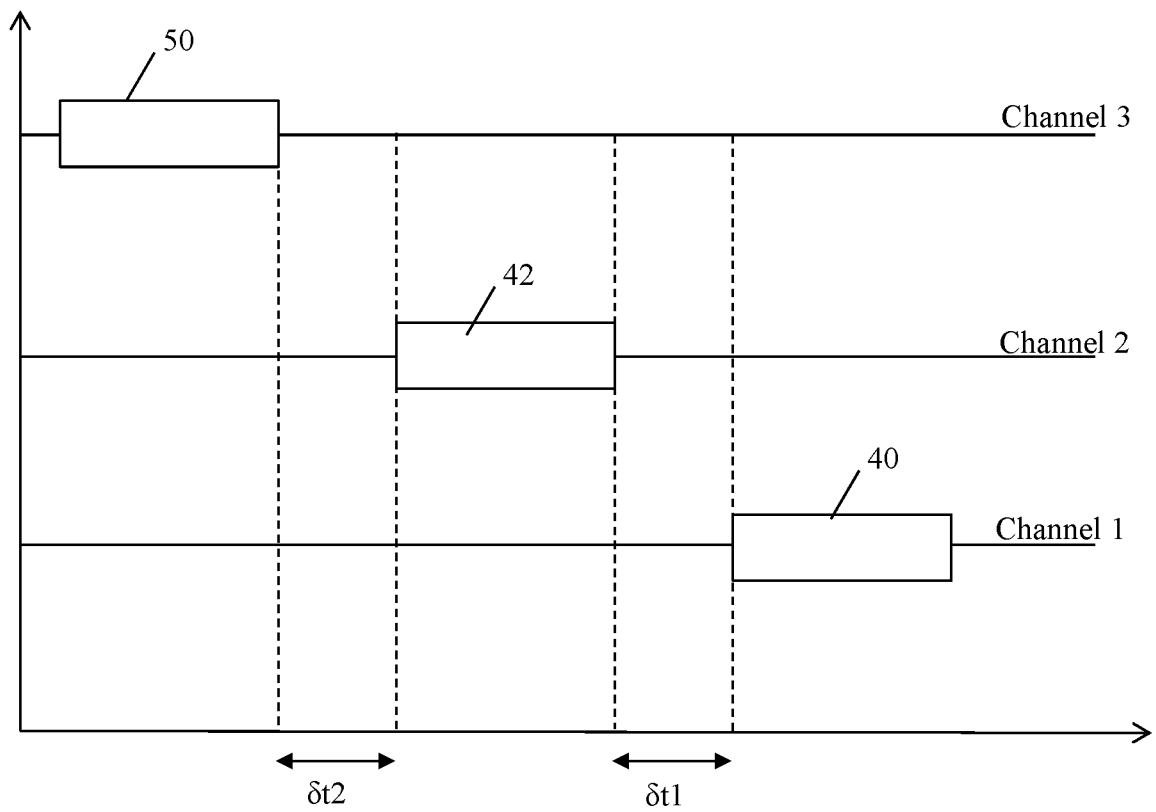
FIG. 3 illustrates the temporal emission of three sound signals by three different speakers, in accordance with an embodiment.

FIG. 3 is an exemplary graph illustrating the successive emission of the first test sound signal 40 on the first channel 42, i.e. by the first speaker, and a second test sound signal 42 on a second channel, i.e. by the second speaker. The first and second test sound signals are spaced apart by a time delay $\delta t1$, i.e. the time elapsed between the end of the first test sound signal and the beginning of the second test sound signal 42.

The emitted sound signals are captured by the microphone and recorded, thereby obtaining a first recorded sound signal and a second recorded sound signal. At step 16, the actual time delay between the first recorded sound signal and the second recorded sound signal is determined.

Figure 4:
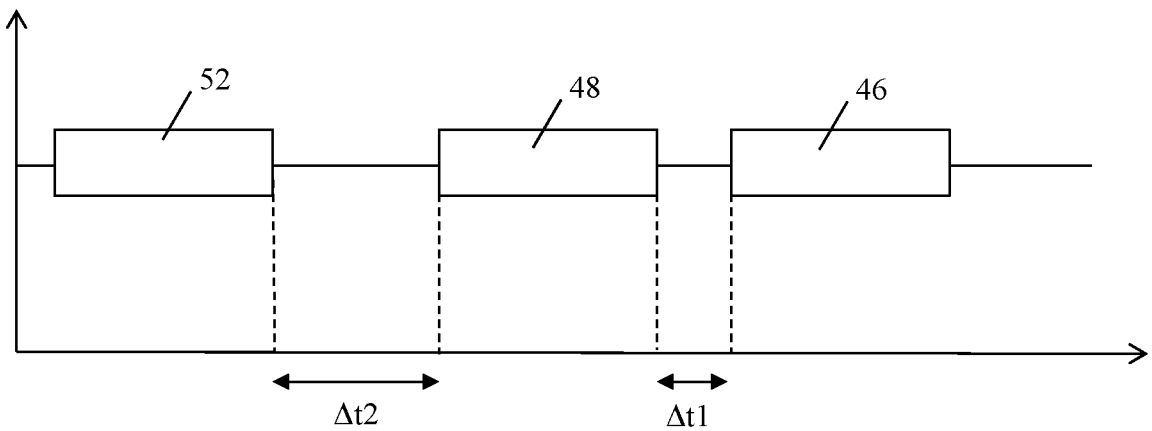
FIG. 4 illustrates the detection of the three sound signals of FIG. 3, in accordance with an embodiment.

FIG. 4 is an exemplary graph illustrating first and second sound signals recorded using the microphone at the given position. The first recorded sound signal 46 and the second recorded sound signal 48 are temporally spaced apart by an actual time delay $\Delta t1$ which corresponds to the time difference between the end of the first recorded sound signal 46 and the beginning of the second recorded sound signal 48.

At step 18, the actual time delay is compared to the reference time delay received at step 12. At step 20, it is determined whether there is a match between the given position of the microphone that was used to recording the test sound signals at step 14 and the target position for the microphone using the result of the comparison performed at step 18.

If the actual time delay substantially corresponds to the reference time delay, then it is concluded that there is a match between the given or actual position of the microphone and the target position. On the other end, if the actual time delay is different from the reference time delay, then it is concluded that there is no match between the given position of the microphone and the target position, i.e. the microphone is not located at the target position required for performing a sound test for example.

In one embodiment, a match is determined when the actual time delay is comprised within a predefined range of time delays which contains the reference time delay, and a mismatch is determined when the actual time delay is outside of the range of time delays.

At step 22, an indication of the match/mismatch between the given position of the microphone and its target position is outputted. In one embodiment, the indication of the match/mismatch is stored in memory.

In one embodiment, step 22 consists in outputting an indication only when a match between the given position of the microphone and the target position is found.

In another embodiment, step 22 consists in outputting an indication only when a mismatch is found between the given position of the microphone and the target position.

In a further embodiment, two different types of indication may be outputted at step 22. A first indication of a match may be outputted when a match between the given position of the microphone and the target position is found, and a second and different indication may be outputted when a mismatch between the given position of the microphone and the target position is found.

In one embodiment, the indication of the match/mismatch is a visual indication. For example, a light may illuminate to indicate a match between the given position of the microphone and the target position.

In another embodiment, the indication of the match/mismatch is an audio indication. For example, a sound may be emitted when a match between the given position of the microphone and the target position is found.

It should be understood that the position of the speakers is fixed and does not vary in time, i.e. the position of the speakers at the time of emitting the test sound signals is identical to that the speakers at the time of emitting the reference sound signals.

In one embodiment, the first and second test sound signals are identical. In another embodiment, the first and second test sound signals may be different. Similarly, the first and second reference sound signals may be identical. Alternatively, they may be different. It should also be understood that the first test sound signal may be identical to the first reference sound signal and/or the second test sound signal may be identical to the second reference sound signal. Alternatively, the first test sound signal may be different from the first reference sound signal and/or the second test sound signal may be different from the second reference sound signal.

In one embodiment, the same microphone is used for both generating the first and second reference signals and the first and second sound signals recorded at step 14. In another embodiment, different microphones may be used.

In one embodiment, the method 10 further comprises emitting the first test sound signal and emitting the second test sound signal.

Figure 2:
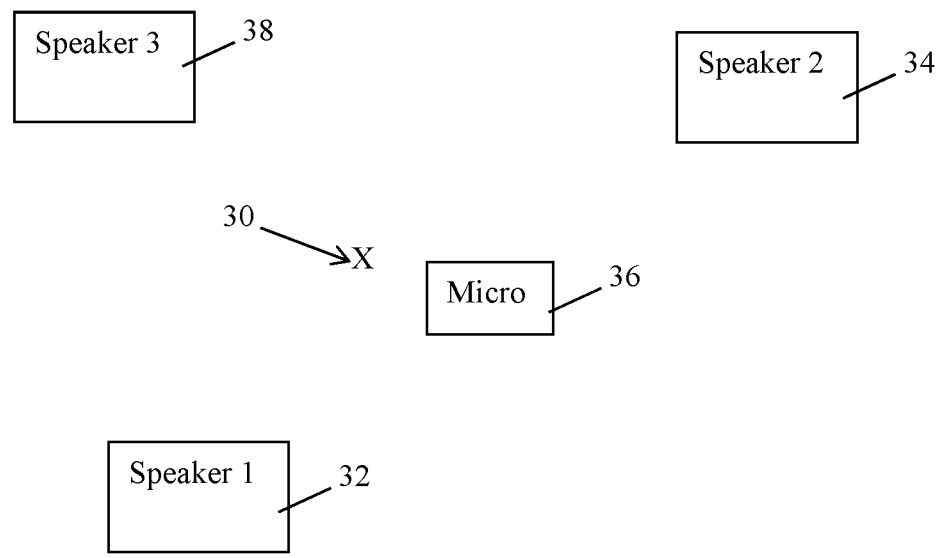
FIG. 2 illustrates an exemplary positioning of a microphone relative to three speakers, in accordance with an embodiment.

In one embodiment, the method 10 further comprises receiving a second reference time delay at step 12. In order to obtain the second reference time delay, the microphone is positioned at the target position 30 illustrated in FIG. 2. The second reference time delay corresponds to the time delay that occurs between the capture of the second reference sound signal and the capture of a third reference sounds signal emitted by a third speaker, e.g. speaker 38.

As described above, the second reference sound signal is emitted by the second speaker, e.g. speaker 34, while the third reference sound signal is emitted by the third and different speaker, e.g. speaker 38. The playback system used for playing back the second and third reference sound signals via the second and third speakers, respectively, is configured for successively playing back the second and third reference sound signals so that a time delay is present between the end of the playback of the second reference sound signal emitted via the second speaker and the beginning of the playback of the third reference sound signal emitted via the third speaker. This further or second time delay may be identical to the above-described first reference time delay. Alternatively, the second time delay may be different from the first reference time delay.

When a second reference time delay is received at step 12, a third test sound signal is played back via the third speaker and recorded using the microphone located at the given position. The emission of the third test sound signal is spaced apart from the second test signal by an amount of time corresponding to the second reference time delay. Referring back to FIG. 3, a third test sound signal 50 is emitted on the third channel, i.e. via the third speaker. The second and third test sound signals are spaced apart by a time delay δt2, i.e. the time elapsed between the end of the second test sound signal and the beginning of the third test sound signal 42.

At step 14, the third test sound signal is captured and recorded at step 14 using the microphone being positioned at the given positon. A step 16, a second actual time delay, i.e. the actual time delay between the second recorded sound signal and the third recorded sound signal, is determined.

Referring back to FIG. 4, the second recorded sound signal 48 and the second recorded sound signal 52 are temporally spaced apart by a second actual time delay Δt2 which corresponds to the time difference between the end of the second recorded sound signal 48 and the beginning of the third recorded sound signal 52.

Step 18 further comprises comparing the second actual time delay to the second reference time delay received at step 12. At step 20, the match or mismatch between the given position of the microphone and the target position is performed according to the result of the comparison performed at step 18.

In one embodiment, a match between the given position of the microphone and the target position is determined only if the first actual time delay between the captured first and second test sounds signals correspond to the first reference time delay and the second actual time delay between the captured second and third test sounds signals correspond to the second reference time delay. As described above, a range of reference time delay values may be used for determining whether a match occurs.

In one embodiment, a mismatch between the given position of the microphone and the target position is determined if the first actual time delay between the captured first and second test sounds signals is different from the first reference time delay and/or the second actual time delay between the captured second and third test sounds signals is different from the second reference time delay.

It should be understood that the method 10 may be embodied as a computer machine comprising at least one processing unit or processor, a communication unit and a memory having stored thereon statements and/or instructions that, when executed by the processing unit, executes the steps of the method 10.

Figure 5:
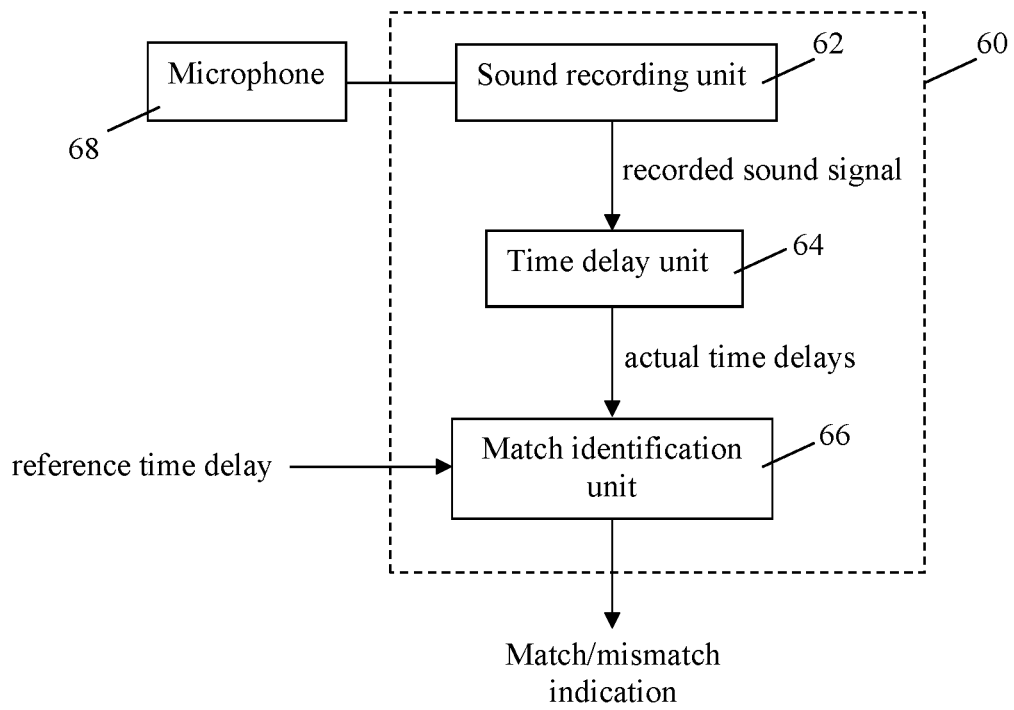
FIG. 5 is a block diagram of a system for determining whether a microphone occupies a desired position using time delays between successively detected signals, in accordance with an embodiment.

FIG. 5 illustrates one embodiment of a system 60 comprising at least a sound recording unit 62, a time delay unit 64 and a match identification unit 66.

The sound recording unit 62 is connectable to the microphone 68 positioned at the given position and configured for recording, via the microphone 68, the first and second test sound signals described above, and optionally the third test sound signal if any. The recorded test sound signals are then transmitted to the time delay unit 64.

The time delay unit 64 is configured for determining the actual time delay between the first and second recorded test sound signals, and optionally the second actual time delay between the second and third recorded test sound signals, as described above with respect to the method 10. The determined time delay(s) is(are) transmitted to the match identification unit 66.

The match identification unit 66 receives the reference time delay(s) and is configured for comparing the determined time delay(s) to the reference time delay(s) as described above, to determine if the given or actual position of the microphone corresponds to the target position and output an indication of the match/mismatch, as described above with respect to the method 10.

In one embodiment, the system 60 further comprises a sound emitting unit connected to the speakers and configured for playing back the test sound signals via the speakers according to the reference time delay(s), as described above with respect to the method 10.

In one embodiment, the system 60 further comprises a memory on which a database storing is stored. The database may contain the reference time delay(s) and the test sound signals to be played back for example.

In one embodiment, the system 60 may further comprise a visual indicating device such as a lighting system, a display or the like for visually informing the user of the match/mismatch. For example, the match identification unit 66 may be configured to generate a written message indicative of the match/mismatch and transmit the generated message to a display to be displayed thereon.

In another embodiment, the match identification unit 66 may be connected to a given one of the speakers used for playing back the test sound signals and configured for generating an audio signal to be played back via the given speaker. Alternatively, a further speaker may be used for playing back the audio signal.

In one embodiment, each one of the units 62-66 is provided with a respective processing unit such as a microprocessor, a respective memory and respective communication means. In another embodiment, at least two of the units 62-66 may share a same processing unit, a same memory and/or same communication means. For example, the system 60 may comprise a single processing unit used by each unit 62-66, a single memory and a single communication unit.

Figure 6:
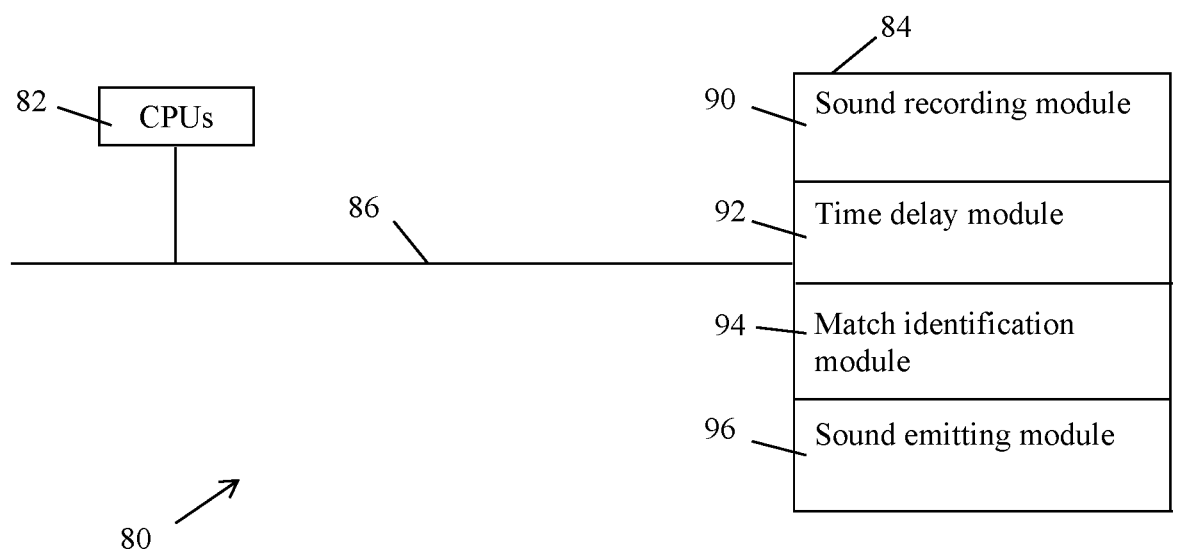
FIG. 6 is a block diagram of a processing module adapted to execute at least some of the steps of the method of FIG. 1, in accordance with an embodiment.

FIG. 6 is a block diagram illustrating an exemplary processing module 80 for executing the steps 12 to 22 of the method 10, in accordance with some embodiments. The processing module 80 typically includes one or more Computer Processing Units (CPUs) and/or Graphic Processing Units (GPUs) 82 for executing modules or programs and/or instructions stored in memory 84 and thereby performing processing operations, memory 84, and one or more communication buses 86 for interconnecting these components. The communication buses 86 optionally include circuitry (sometimes called a chipset) that interconnects and controls communications between system components. The memory 84 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 84 optionally includes one or more storage devices remotely located from the CPU(s) 82. The memory 84, or alternately the non-volatile memory device(s) within the memory 84, comprises a non-transitory computer readable storage medium. In some embodiments, the memory 84, or the computer readable storage medium of the memory 84 stores the following programs, modules, and data structures, or a subset thereof:

a sound recording module 90 for generating recorded test sound signals;

a time delay module 92 for calculating the time delay between two recorded test sound signals;

a match identification module 94 for determining a match/mismatch between the actual position of the microphone and its target position; and a sound emitting module 96 for playing back the test sound signals via the speakers.

It should be understood that the distance module 96 may be omitted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 84 may store a subset of the modules and data structures identified above. Furthermore, the memory 84 may store additional modules and data structures not described above.

Although FIG. 6 shows a processing module 80, FIG. 6 is intended more as functional description of the various features which may be present in a management module than as a structural schematic of the embodiments described herein. In practice, and as recognized by those of ordinary skill in the art, items shown separately could be combined and some items could be separated.

Figure 7:
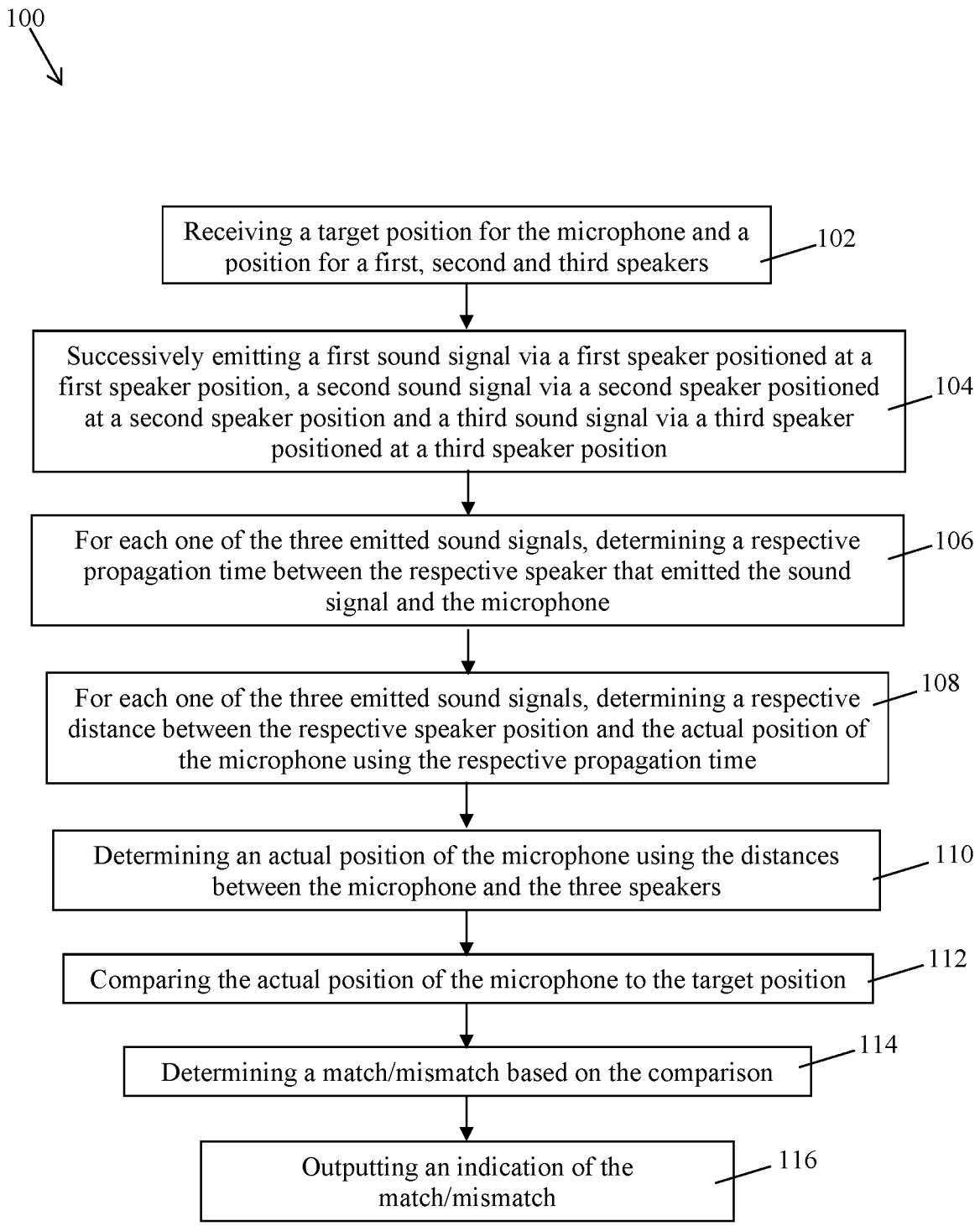
FIG. 7 is a flow chart of a method for determining whether a microphone occupies a desired position via the determination of an actual position of the microphone, in accordance with an embodiment.

FIG. 7 illustrates one embodiment of a further method 100 for determining whether a given microphone is positioned at a desired position.

Similarly to the method 10, the method 100 may be used in the context of a simulator such as a vehicle simulator in order to ensure that a microphone to be used in a sound text for example is positioned at a desired position.

The microphone is positioned at given position and the method 100 is performed in order to determine whether the given position at which the microphone is corresponds or not the desired position for the microphone.

At step 102, the target or desired position for the microphone is received. The position of the three speakers to be used for emitting sound signals is also received at step 102. A position may be expressed as coordinates (x, y, z) for example.

At step 105, three sound signals are emitted sequentially each from a respective speaker. Referring back to FIG. 2, a first sound signal is emitted via the first speaker 32, a second sound signal is emitted via the second speaker 34 and a third sound signal is emitted via the third speaker 38.

In one embodiment, a time delay exists between the end of the emission of a sound signal and the beginning of the emission of the subsequent sound signal. For example, a first time delay is present between the end of the emission of the first sound signal by the first speaker 32 and the beginning of the emission of the second sound signal by the second speaker 34, and a second time delay is present between the end of the emission of the second sound signal and the beginning of the emission of the third sound signal by the third speaker 38.

In one embodiment, the first and second time delays are identical. In another embodiment, the first and second time delays are different.

In one embodiment, the first and/or second time delays are chosen so to be longer than the reverberation time of the room in which the method 100 is performed to avoid or limit interferences between echoes of a given sound signal and a subsequent sound signal.

At step 106, the sound signal emitted at step 104 are detected by the microphone and the propagation time between the respective speaker that emitted the sound signal and the microphone is determined for each one of the three signals. The propagation time corresponds to the time elapsed between the beginning of the emission of a sound signal via its speaker and the beginning of the reception of the same sound signal by the microphone. The person skilled in the art will understand that the propagation time may also be defined as the time elapsed between the end of the emission of a sound signal by a speaker and the end of the reception of the same sound signal by the microphone.

As a result, a first propagation time is determined for the first sound signal emitted by the first speaker, a second propagation time is determined for the second sound signal emitted by the second speaker and a third propagation time is determined for the third sound signal emitted by the third speaker.

At step 108, for each emitted sound signal, the distance between the respective speaker that emitted the sound signal and the microphone is determined using the respective propagation time determined at step 106 and the speed of sound. As a result, the distance between the first speaker and the microphone is determined using the propagation time determined for the first sound signal, the distance between the second speaker and the microphone is determined using the propagation time determined for the second sound signal and the distance between the third speaker and the microphone is determined using the propagation time determined for the third sound signal.

At step 110, the actual position of the microphone from which the three sound signals have been detected is determined using the determined distances between the microphone and the three speakers used for emitting the three sound signals, as described above.

Then the actual position of the microphone determined at step 110 is compared to the target position for the microphone received at step 102. At step 114, it is determined whether the actual position of the microphone matches the target position. If the determined actual position corresponds to the target position, then a match between the actual position of the microphone and the target position is determined. On the other end, if the determined actual position of the microphone is different from the target position for the microphone, then a mismatch between the actual position and the target position is determined. The indication of the match/mismatch between the actual position of the microphone and its target position is outputted at step 116. In one embodiment, the indication of the match/mismatch is stored in memory.

In one embodiment, step 116 consists in outputting an indication only when a match between the actual position of the microphone and the target position is found.

In another embodiment, step 116 consists in outputting an indication only when a mismatch is found between the actual position of the microphone and the target position.

In a further embodiment, two different types of indication may be outputted at step 116. A first indication of a match may be outputted when a match between the actual position of the microphone and the target position is found, and a second and different indication may be outputted when a mismatch between the actual position of the microphone and the target position is determined.

In one embodiment, the indication of the match/mismatch is a visual indication. For example, a light may be illuminated to indicate a match between the actual position of the microphone and the target position.

In another embodiment, the indication of the match/mismatch is an audio indication. For example, a sound may be emitted when a match between the actual position of the microphone and the target position is found.

In one embodiment, the method 100 further comprises a step of calculating the position difference between target position and actual position such as the vector from the actual position to the target position. In this case, the method 100 may further comprise a step of determining instructions for moving the microphone from the actual position to the target position based on the position difference and outputting the instructions. In one embodiment, the instructions may be displayed on a display. In another embodiment, the instructions may be verbal instructions.

It should be understood that the position of the three speakers is fixed and does not vary in time, i.e. the position of the speakers at the time of emitting the test sound signals is identical to that the speakers at the time of emitting the reference sound signals and the position at the time of determining the target position of the microphone is identical to that at the time of executing the method 100.

In one embodiment, the three sound signals emitted at step 104 are identical. In another embodiment, at least one of the three sound signals is different from the other two sound signals.

In one embodiment, the target position corresponds to a previous position for the microphone that was used for calibrating the sound system of a simulator or performing a sound test for example. In this case, the target position may have been determined using steps 104-110 of the method 100.

In one embodiment, the determination of the actual microphone position using a trilateration method, as known in the art. In this case, knowing the distance between each speaker and the microphone, the position of the microphone relative to that of the three speakers is determined using the geometry of circles, spheres or triangles, as known in the art.

In another embodiment, the determination of the actual microphone position is determined using a nonlinear least square fitting method, as known in the art. In this case, the actual position of the microphone is iteratively determined and may be expressed as follows:

$$P_{Next} = \frac{1}{N}\sum_{i=0}^{N} S_i + D_i = \frac{P_{Prev} - S_i}{\|P_{Prev} - S_i\|}$$

where $P_{Next}$, $P_{Prev}$, $D_i$ et $S_i$ are position vectors expressed in the coordinate system (x,y,z);

$P_{Next}$ is the next position for the microphone;

$P_{Prev}$ is the previous determined position for the microphone;

N is the number of speakers (N=3 in the present case);

$D_i$ is the distance between the microphone and the speaker i; and $S_i$ is the position of the speaker i;

In one embodiment, the first previous position, i.e. $P_0$, used in the method corresponds to the position that was determined the last time the method was executed. In another embodiment, $P_0$ is chosen as being the average position of the speakers positions. In a further embodiment, the first previous position $P_0$ is chosen as being the center of the triangle formed by the three speakers.

It should be understood that the method 100 may be embodied as a computer machine comprising at least one processing unit or processor, a communication unit and a memory having stored thereon statements and/or instructions that, when executed by the processing unit, executes the steps of the method 100.

In one embodiment, only steps 104 to 110 of the method 100 may be performed to determine the actual position of the microphone. The resulting method is then a method is then a computer-implemented method for determining the actual position of a microphone.

While the above method 100 and system 140 each refer to the emission of three sound signals by three separate speakers, the person skilled in the art will understand that only two sound signals may be sequentially emitted by two distinct speakers each having a respective position. In this case, the step 106 comprises measuring a first elapsed time between the emission of the first sound signal by the first speaker and a detection of the first sound signal by the microphone, and a second elapsed time between the emission of the second sound signal by the second speaker and a detection of the second sound signal by the microphone. The step 108 then comprises determining a first distance between the first speaker position and the microphone using the first elapsed time, and a second distance between the second speaker position and the microphone using the second elapsed time. It should also be understood that the step 110 of determining the actual position of the microphone is performed using only using the first and second determined distances and the positions of the first and second speakers.

When only two speakers are used, the actual position of the microphone may be determined by choosing a point located on the circle representing the intersection of a first sphere having its center located at the position of the first speaker and its radius corresponding to the determined distance between the microphone and the first speaker, and a second sphere having its center located at the position of the second speaker and its radius corresponding to the determined distance between the microphone and the second speaker. The actual point of the microphone is then chosen as being the point of the intersection circle that is the closest to a reference point. The reference point may be the average position between the positons of the two speakers. In another example, the actual position of the microphone may be a point randomly chosen on the circle.

Figure 8:
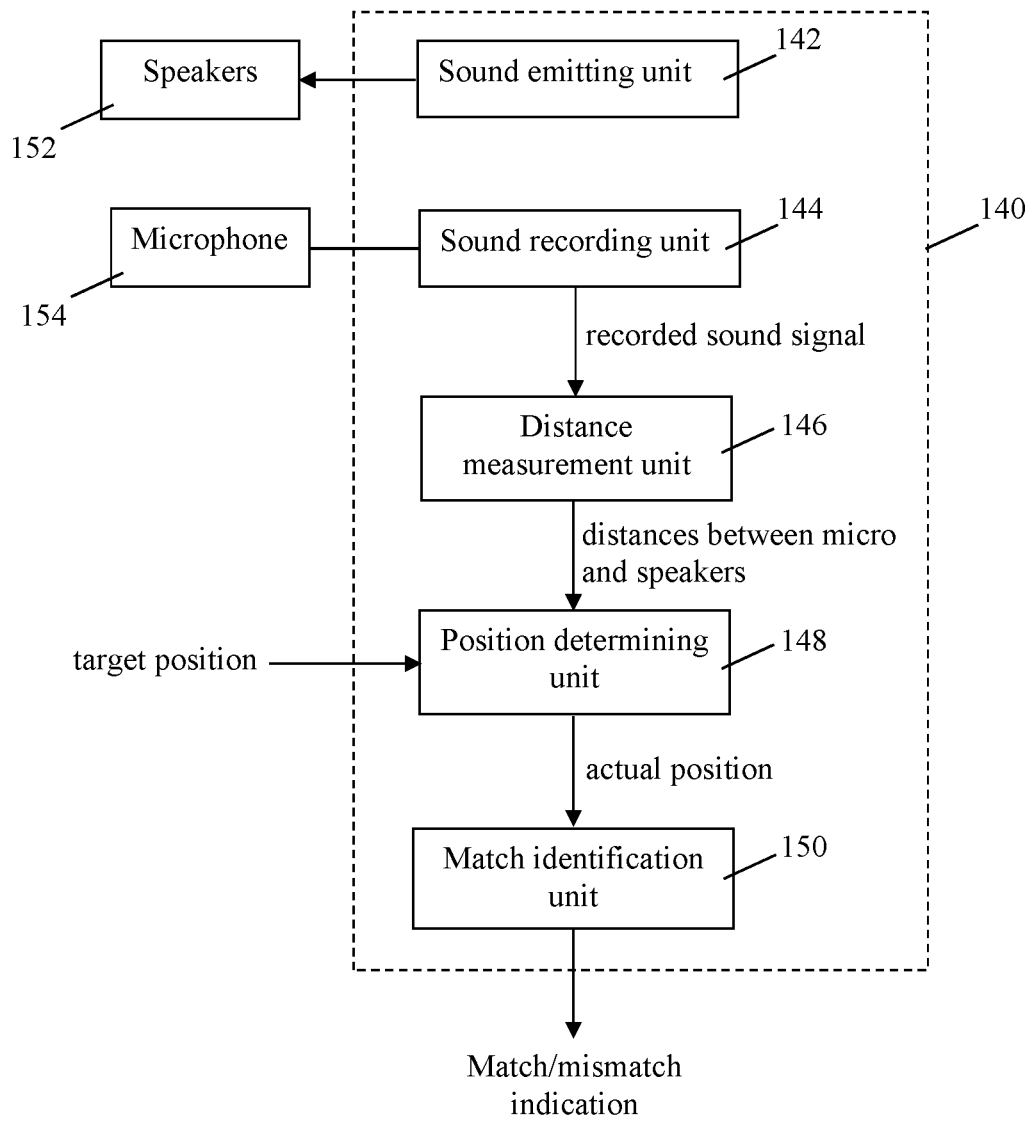
FIG. 8 is a block diagram of a system for determining whether a microphone occupies a desired position via the determination of an actual position of the microphone, in accordance with an embodiment.

FIG. 8 illustrates one embodiment of a system 140 for determining whether a given microphone is positioned at a desired or target position. The system comprises a sound emitting unit 142, a sound recording unit 144, a distance measurement unit 146, a position determining unit 148 and a match identification unit 150.

The sound emitting unit 142 is connected to the three speakers 152 and configured for generating three sound signals and playing back the three sound signals via three different speakers each having a respective fixed and known position. In one embodiment, the three sound signals to be played back by each speaker 152 are stored into a database and the sound emitting unit 142 is configured for retrieving the sound signal to be played back by each speaker 152 and playing back the sound signals via their respective speaker 152, two successive sound signals being temporally spaced apart by a respective time delay, as described above with respect to the method 100.

The sound recording unit 144 is connected to the microphone positioned at an actual or given position and is configured for recording the sound signals captured by the microphone and emitted by the speakers 154, as described above with respect to the method 100.

The distance measurement unit 146 receives the determined distance between the microphone and each speaker 152 from the sound recording unit 144 and is configured for determining the propagation time of each signal and determining the actual distance between the microphone 154 and each speaker 152 using the speed of sound and the respective propagation time, as described above with respect to the method 100.

The position determining unit 148 receives the positions of the three speakers which may be stored in the database for example and the distance between the microphone and each speaker and is configured for determining the actual position of the microphone as described above with respect to the method 100.

The match identification unit 150 receives the target position for the microphone which may be stored in the database for example and the actual position of the microphone and is configured for determining a match/mismatch between the actual position of the microphone and its target position, as described above with respect to the method 100.

In one embodiment, the system 140 may further comprise a visual indicating device such as a lighting system, a display or the like for visually informing the user of the match/mismatch. For example, the match identification unit 150 may be configured to generate a written message indicative of the match/mismatch and transmit the generated message to a display to be displayed thereon.

In another embodiment, the match identification unit 150 may be connected to a given one of the speakers used for playing back the test sound signals and configured for generating an audio signal to be played back via the given speaker. Alternatively, a further speaker may be used for playing back the audio signal.

In one embodiment, the match identification unit 150 is further configured for determining a difference between the actual position and the target position and generate instructions for moving the microphone form the actual position to the target position, as described above.

In one embodiment, each one of the units 142-150 is provided with a respective processing unit such as a microprocessor, a respective memory and respective communication means. In another embodiment, at least two of the units 62-66 may share a same processing unit, a same memory and/or same communication means. For example, the system 140 may comprise a single processing unit used by each unit 142-150, a single memory and a single communication unit.

In one embodiment, the match identification unit 150 may be omitted. In this case, the resulting system is a system for determining the actual position of a microphone.

Figure 9:
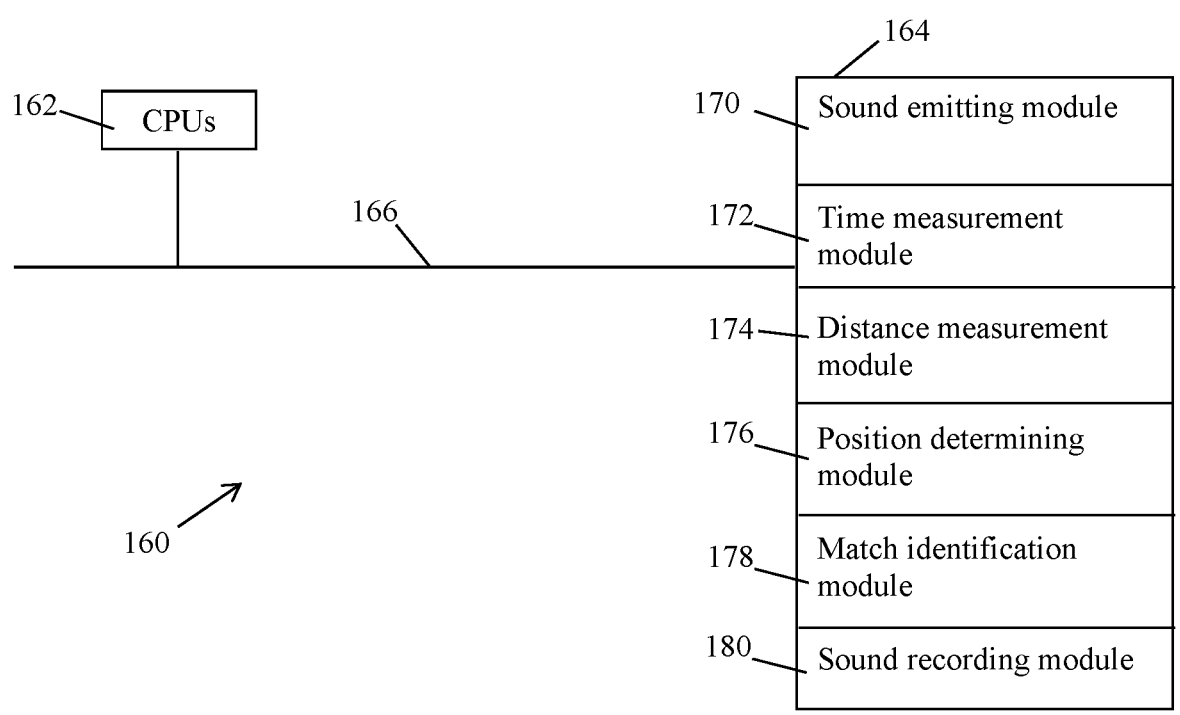
FIG. 9 is a block diagram of a processing module adapted to execute at least some of the steps of the method of FIG. 7, in accordance with an embodiment.

FIG. 9 is a block diagram illustrating an exemplary processing module 160 for executing the steps 102 to 116 of the method 100, in accordance with some embodiments. The processing module 160 typically includes one or more Computer Processing Units (CPUs) and/or Graphic Processing Units (GPUs) 162 for executing modules or programs and/or instructions stored in memory 164 and thereby performing processing operations, memory 164, and one or more communication buses 166 for interconnecting these components. The communication buses 166 optionally include circuitry (sometimes called a chipset) that interconnects and controls communications between system components. The memory 164 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 164 optionally includes one or more storage devices remotely located from the CPU(s) 162. The memory 164, or alternately the non-volatile memory device (s) within the memory 164, comprises a non-transitory computer readable storage medium. In some embodiments, the memory 164, or the computer readable storage medium of the memory 164 stores the following programs, modules, and data structures, or a subset thereof:

a sound emitting module 170 for emitting sound signals via speakers;

a time measurement module 172 for measuring the propagation time of each emitted sound signal a distance measurement module 174 determining the distance between the microphone and each speaker;

a position determining module 176 for determining the actual position of the microphone;

a match identification module 178 for determining a match/mismatch between the actual position of the microphone and its target position and a sound recording module 180 for recording the sound signals captured by the microphone.

It should be understood that the sound recording module 180 may be omitted.

Similarly, the match identification module 178 may be omitted. In this case, the processing module 160 is configured for only determining the actual positon of a microphone.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 164 may store a subset of the modules and data structures identified above. Furthermore, the memory 164 may store additional modules and data structures not described above.

Although it shows a processing module 160, FIG. 9 is intended more as functional description of the various features which may be present in a management module than as a structural schematic of the embodiments described herein. In practice, and as recognized by those of ordinary skill in the art, items shown separately could be combined and some items could be separated.

While the above methods and systems are described in the context of a vehicle simulator such as an aircraft simulator, it should be understood that the methods and systems may be used in other contexts in which a microphone has to be positioned at a target position at which the microphone has to be positioned such as a previous position at which the microphone was positioned. The above-described methods and systems may be used for determining whether the actual position of the microphone corresponds or not o the target position.

The embodiments of the invention described above are intended to be exemplary only. The scope of the invention is therefore intended to be limited solely by the scope of the appended claims.

We claim:

1. A computer-implemented method for positioning a microphone, the computer-implemented method comprising:

emitting a first sound signal via a first speaker positioned at a first speaker position, and a second sound signal via a second speaker positioned at a second speaker position;

measuring a first elapsed time between the emission of the first sound signal by the first speaker and a detection of the first sound signal by the microphone, and a second elapsed time between the emission of the second sound signal by the second speaker and a detection of the second sound signal by the microphone;

determining a first distance between the first speaker position and the microphone using the first elapsed time, and a second distance between the second speaker position and the microphone using the second elapsed time and;

determining at least one potential position of the microphone using the first and second distances and the first and second speaker positions;

selecting an actual position of the microphone amongst the at least one potential position as being a closest one of the at least one potential position to a reference point;

comparing the actual position of the microphone to a target position for the microphone;

determining a match between the actual position and the target position for the microphone if the comparison indicates that the actual position corresponds to the target position, and a mismatch between the actual position and the target position for the microphone if the comparison indicates that the actual position is different from the target position; and outputting an indication of one of the match and the mismatch.

2. The computer-implemented method of claim 1, further comprising:

emitting a third sound signal via a third speaker positioned at a third speaker position;

measuring a third elapsed time between the emission of the third sound signal by the third speaker and a detection of the third sound signal by the microphone; and determining a third distance between the third speaker position and the microphone using the third elapsed time, said determining the actual position of the microphone is performed using further the third distance and the third speaker position.

3. The computer-implemented method of claim 2, wherein the emission of the first sound signal and the emission of the second sound signal are spaced apart by a first time delay and the emission of the second sound signal and an emission of the third sound signal are spaced apart by a second time delay, the first and second time delays being each greater than a reverberation time.

4. The computer-implemented method of claim 2, wherein said determining an actual position of the microphone is performed using one of a trilateration method and a nonlinear least squares fitting method.

5. The computer-implemented method of claim 1, wherein said outputting the indication comprises outputting the indication of the mismatch between the actual position and the target position for the microphone.

6. The computer-implemented method of claim 5, further comprising determining a suggested displacement for the microphone using the actual position and the target position, said outputting the indication of the mismatch comprising outputting the suggested displacement for the microphone.

7. The computer-implemented method of claim 1, wherein said determining the match comprises determining the match between the actual position and the target position for the microphone if the actual position is comprised within a range of position containing the target position and said determining the mismatch comprises determining the mismatch between the actual position and the target position for the microphone if the actual position is outside of the range of position.

8. A system for positioning a microphone, the system comprising:
a sound emitting unit configured for emitting a first sound signal via a first speaker positioned at a first speaker position and a second sound signal via a second speaker positioned at a second speaker position;
a distance measurement unit configured for:
measuring a first elapsed time between the emission of the first sound signal by the first speaker and a detection of the first sound signal by the microphone and a second elapsed time between the emission of the second sound signal by the second speaker and a detection of the second sound signal by the microphone; and
determining a first distance between the first speaker position and the microphone using the first elapsed time and a second distance between the second speaker position and the microphone using the second elapsed time and;
a position determining unit configured for determining at least one potential position of the microphone using the first and second distances and the first and second speaker positions and selecting an actual position of the microphone amongst the at least one potential position as being a closest one of the at least one potential position to a reference point;
a match identification unit configured for:
comparing the actual position of the microphone to a target position for the microphone;
determining a match between the actual position and the target position for the microphone if the comparison indicates that the actual position corresponds to the target position and a mismatch between the actual position and the target position for the microphone if the comparison indicates that the actual position is different from the target position; and
outputting an indication of one of the match and the mismatch.

9. The system of claim 8, wherein
the sound emitting unit is further configured for emitting a third sound signal via a third speaker positioned at a third speaker position;
the distance measurement unit is further configured for:
measuring a third elapsed time between the emission of the third sound signal by the third speaker and a detection of the third sound signal by the microphone; and
determining a third distance between the third speaker position and the microphone using the third elapsed time; and
the position determining unit is configured for determining the actual position of the microphone using further the third distance and the third speaker position.

10. The system of claim 9, wherein the emission of the first sound signal and the emission of the second sound signal are spaced apart by a first time delay and an emission of the second sound signal and an emission of the third sound signal are spaced apart by a second time delay.

11. The system of claim 10, wherein the first and second time delays are each greater than a reverberation time.

12. The system of claim 9, wherein the position determining unit is configured for determining the actual position of the microphone using one of a trilateration method and a nonlinear least squares fitting method.

13. The system of claim 8, wherein the match identification unit is configured for outputting the indication of the mismatch between the actual position and the target position for the microphone.

14. The system of claim 13, further comprising a displacement determining unit configured for determining a suggested displacement for the microphone using the actual position and the target position, the match identification unit being configured for outputting the suggested displacement for the microphone.

15. The system of claim 8, wherein the match identification unit is configured for:
determining the match between the actual position and the target position for the microphone if the actual position is comprised within a range of position containing the target position; and
determining the mismatch between the actual position and the target position for the microphone if the actual position is outside of the range of position.

16. A computer-implemented method for determining an actual position of a microphone, comprising:
emitting a first sound signal via a first speaker positioned at a first speaker position, a second sound signal via a second speaker positioned at a second speaker position and a third sound signal via a third speaker positioned at a third speaker position, wherein the emitting of the first sound signal and the emitting of the second sound signal are spaced apart by a first time delay and the emitting of the second sound signal and the emitting of the third sound signal are spaced apart by a second time delay, and wherein the first and second time delays are each greater than a reverberation time;
measuring a first elapsed time between the emitting of the first sound signal by the first speaker and a detection of the first sound signal by the microphone, a second elapsed time between the emitting of the second sound signal by the second speaker and a detection of the second sound signal by the microphone, and a third elapsed time between the emitting of the third sound signal by the third speaker and a detection of the third sound signal by the microphone;
determining a first distance between the first speaker position and the microphone using the first elapsed time, a second distance between the second speaker position and the microphone using the second elapsed time, and a third distance between the third speaker position and the microphone using the third elapsed time;
determining at least one potential position of the microphone using the first, second and third distances and the first, second and third speaker positions;
selecting an actual position of the microphone amongst the at least one potential position as being a closest one of the at least one potential position to a reference point; and
outputting the actual position of the microphone.

17. The computer-implemented method of claim 16, further comprising recording, via the microphone, the first sound signal emitted by the first speaker, the second sound signal emitted by the second speaker and the third sound signal emitted by the third speaker.

18. The computer-implemented method of claim 16, wherein said determining the actual position of the microphone is performed using one of a trilateration method and a nonlinear least squares fitting method.

19. The computer-implemented method of claim 16, wherein the at least one potential position is located on a circle representing an intersection between a first sphere and a second sphere, the first sphere having a first center located at the first speaker position and a first radius corresponding to the first distance, and the second sphere having a second center located at the second speaker position and a second radius corresponding to the second distance.

20. A system for determining the actual position of the microphone, comprising: a communication unit for at least one of receiving and transmitting data, a memory and a processing unit configured for executing the method steps of claim 16.

21. A system for determining an actual position of a microphone, comprising:
   a sound emitting unit configured for emitting a first sound signal via a first speaker positioned at a first speaker position, a second sound signal via a second speaker positioned at a second speaker position, and a third sound signal via a third speaker positioned at a third speaker position, wherein the emitting of the first sound signal and the emitting of the second sound signal are spaced apart by a first time delay and the emitting of the second sound signal and the emitting of the third sound signal are spaced apart by a second time delay, and wherein the first and second time delays are each greater than a reverberation time;
   a distance measurement unit configured for:
      measuring a first elapsed time between the emitting of the first sound signal by the first speaker and a detection of the first sound signal by the microphone, a second elapsed time between the emitting of the second sound signal by the second speaker and a detection of the second sound signal by the microphone, and a third elapsed time between the emitting of the third sound signal by the third speaker and a detection of the third sound signal by the microphone; and
      determining a first distance between the first speaker position and the microphone using the first elapsed time, a second distance between the second speaker position and the microphone using the second elapsed time, and a third distance between the third speaker position and the microphone using the third elapsed time; and
   a position determining unit configured for:
      determining at least one potential position of the microphone using the first, second and third distances and the first, second and third speaker positions;
      selecting an actual position of the microphone amongst the at least one potential position as being a closest one of the at least one potential position to a reference point; and
      outputting the actual position of the microphone.

22. The system of claim 21, further comprising a sound recording unit connectable to the microphone and configured for recording, via the microphone, the first sound signal emitted by the first speaker, the second sound signal emitted by the second speaker and the third sound signal emitted by the third speaker.

23. The system of claim 21, wherein the position determining unit is configured for determining the actual position of the microphone using one of a trilateration method and a nonlinear least squares fitting method.

24. The system of claim 21, wherein the at least one potential position is located on a circle representing an intersection between a first sphere and a second sphere, the first sphere having a first center located at the first speaker position and a first radius corresponding to the first distance, and the second sphere having a second center located at the second speaker position and a second radius corresponding to the second distance.

* * * * *